INVENTOR:
JOSEF BERTELS
By: *[signature]*
ATTORNEYS

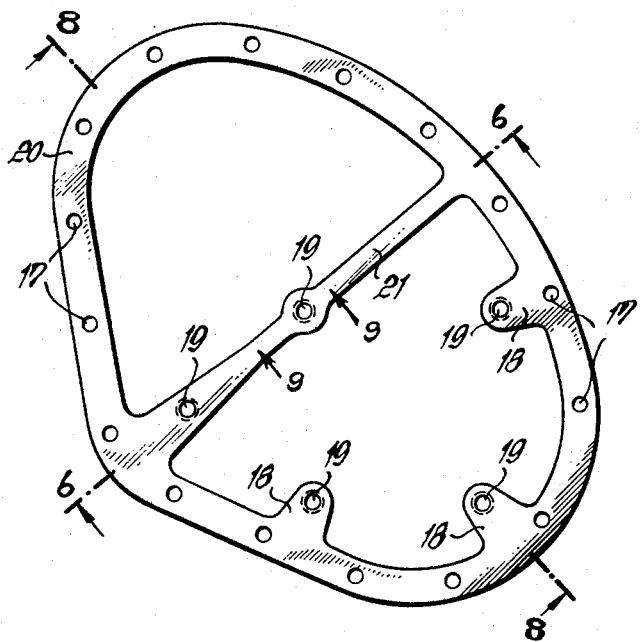
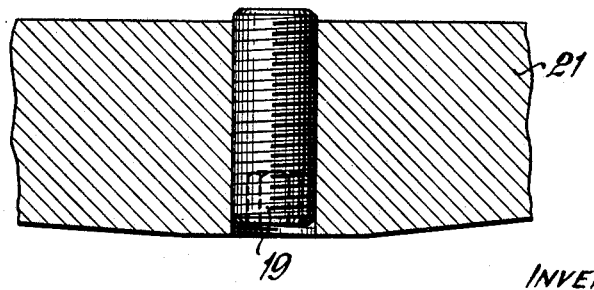

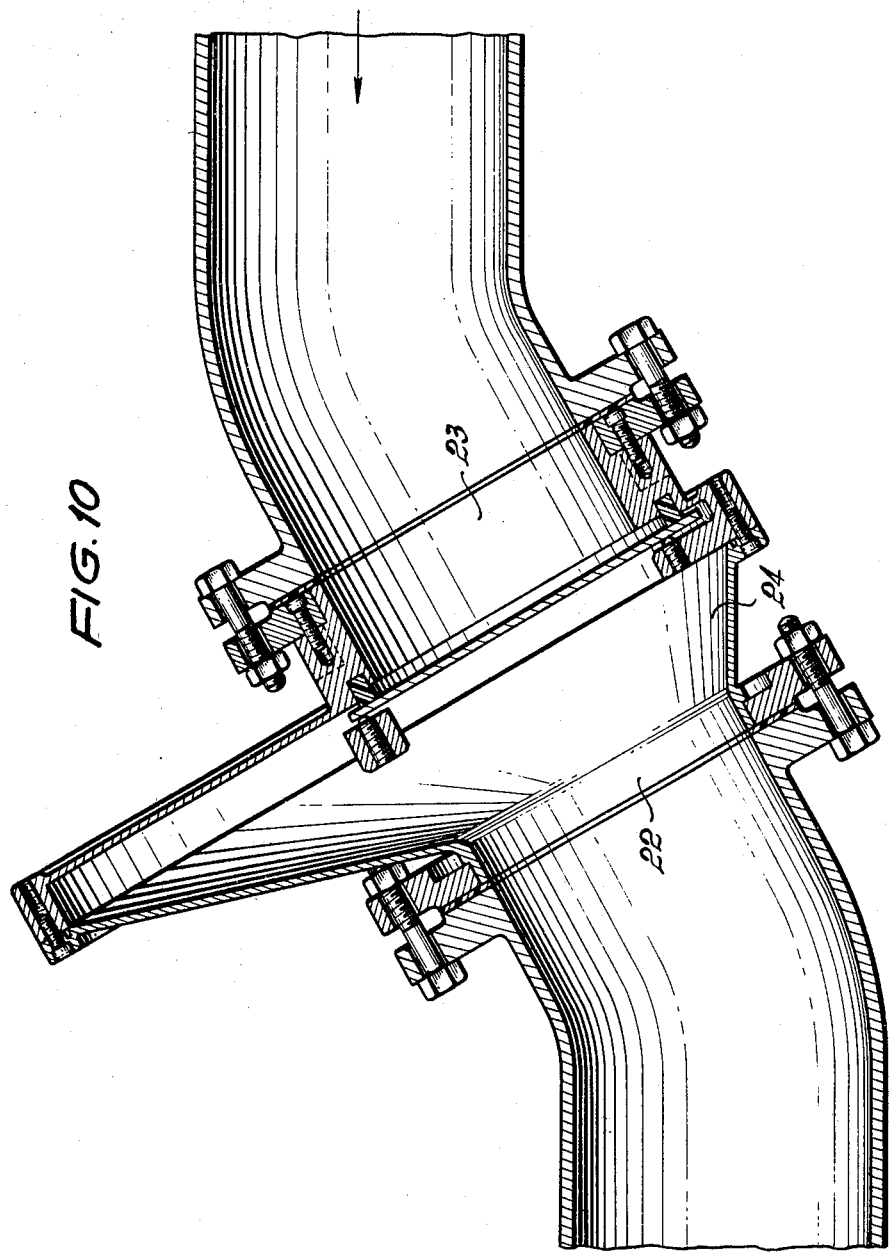

United States Patent Office 3,506,238
Patented Apr. 14, 1970

3,506,238
FLOW CONTROL FOR FLOWABLE MEDIUMS
Josef Bertels, Elsdorfer Str. 10, Giesendorf, Germany
Filed Apr. 1, 1968, Ser. No. 717,511
Int. Cl. F16k 3/10
U.S. Cl. 251—193                                10 Claims

ABSTRACT OF THE DISCLOSURE

A flow control for any flowable medium having a plurality of screws for adjusting the pressure between the closure plate and the sealing ring.

BACKGROUND OF THE INVENTION

The present invention relates to flow controls for controlling the flow of any flowable medium.

Thus, the present invention may be used for controlling the flow of mediums which have good flowing characteristics as well as for mediums which tend to stick or cake. The flow control can be used for dry flowable mediums as well as for moist mediums or mediums which are enriched with liquids. The flow control can be used with granular or powdered mediums within a pipe system or can be situated at the exit of a silo, for example, to control the discharge of a flowable medium therefrom.

Also, the flow control of the invention can be used in a manner according to which it is connected to or forms part of a production or supply installation.

There are at the present time increasing requirements or flow controls in the daily increasing production outputs of fields such as organic and inorganic chemistry, the food industry, the pharmaceutical industry, etc. In applications of this latter type it is necessary to control the flow of solid flowable mediums which may be in the form of pulpy masses as well as in the form of slurries. Lever-actuated flow control valves have long been used successfully for such applications. Such valves may be power-actuated and may be actuated through suitable levers to provide quick-acting closures to control the flow of gas and liquid mediums which sometimes are enriched to a greater or lesser extent with solid particles.

SUMMARY OF THE INVENTION

It is a primary object of the present invention to greatly improve the known flow control structures.

Thus, it is an object of the present invention to provide a flow control which has a relatively small number of components as compared to conventional flow controls.

Also, it is an object of the invention to provide a flow control which is of an exceedingly compact construction capable of being readily attached to or connected into an installation for controlling the flow of a flowable medium therethrough.

Furthermore, the objects of the invention include the provision of a flow control which has a closure plate the operation of which in coaction with other components of the control can be adjusted so as to provide a very precise regulation for the movement of the closure plate.

Also, it is an object of the invention to provide a flow control which presents little friction to flow of the flowable medium therethrough having an outlet of funnel-shaped configuration provided with a slope which contributes to the smooth flow of the medium with little resistance, while at the same time maintaining the compact relatively small size for the entire flow control structure.

In addition, it is an object of the invention to provide a flow control which will prevent accumulation of residues.

Furthermore, it is an object of the invention to provide a flow control which will prevent accumulation of residues a vacuum-tight flow is required and at the same time requiring only a small amount of power for actuating the flow control.

It is an object of the invention also to provide a construction where adjustments may be made, to take care of wear, without requiring complete disassembly of the flow control and thus without any substantial interruption in production.

Also, it is an object of the present invention to provide a construction which enables important components of the flow control to be washed when necessary without any substantial interruption in production.

Furthermore, it is an object of the present invention to provide an exceedingly simple structure for moving a closure plate between open and closed positions.

Also, it is an object of the present invention to provide a structure capable of precisely regulating the pressure between a closure plate and a sealing ring which engages the latter as well as for absorbing forces encountered during hand or power actuation of the control.

The objects of the present invention also include the provision of a structure which requires very little mechanical working of the components of the flow control while at the same time guaranteeing the highest degree of precision.

Also, it is an object of the present invention to provide a structure capable of accomplishing the above objects while at the same time being adapted for use under the widest variation of operating conditions for many different purposes, such as for use in connection with the flow of a relatively soft powder as well as the flow of abrasive granules, such as granules of quartz sand, and also capable of handling flowable mediums under a wide range of thermal, basic, or acid conditions.

Furthermore, it is an object of the invention to provide a flow control which can be used either in connection with substantially vertically flowing mediums or in connection with substantially horizontally flowing mediums, without preventing the movement of a closure plate of the flow control by accumulation of solid particles at movable components of the flow control.

In accordance with the invention the flow control has an inlet housing means provided with an upstream inlet and an outlet housing means connected to a downstream end of the inlet housing means and provided with a downstream outlet. A closure plate is situated at the downstream end of the inlet housing means and has an upstream face directed toward the inlet and a downstream face directed toward the outlet. A sealing ring is carried by the inlet housing means and engages the upstream face of the closure plate, and a moving means is operatively connected to the closure plate for moving the latter between a closed position cutting off communication between the inlet and outlet and an open position providing communication therebetween. A plurality of adjusting screws are situated at the downstream side of the closure plate and extend in the general direction of flow of the flowable medium, these screws having free ends which respectively slidably engage the downstream face of the closure plate, and the inlet housing means has projections which threadedly carry these adjusting screws.

BRIEF DESCRIPTION OF THE DRAWINGS

The invention illustrated by way of example in the accompanying drawings which form part of this application and in which:

FIG. 5b is a top plan view of the bar of FIG. 5a;

FIG. 6 is a longitudinal section of another transverse supporting bar taken along line 6—6 of FIG. 7 in the direction of the arrows;

FIG. 7 is a top plan view of a supporting frame;

FIG. 8 is a transverse section of the frame of FIG. 7, taken along line 8—8 of FIG. 7 in the direction of the arrows;

FIG. 9 is a sectional elevation taken along line 9—9 of FIG. 7 in the direction of the arrows and showing, at an enlarged scale as compared to FIG. 7, the manner in which an adjusting screw is carried by a supporting bar; and FIG. 10 is a partly schematic longitudinal sectional illustration of an embodiment of the flow control of the invention which is adapted to be used with a horizontally flowing medium.

DESCRIPTION OF PREFERRED EMBODIMENTS

Figure 1:
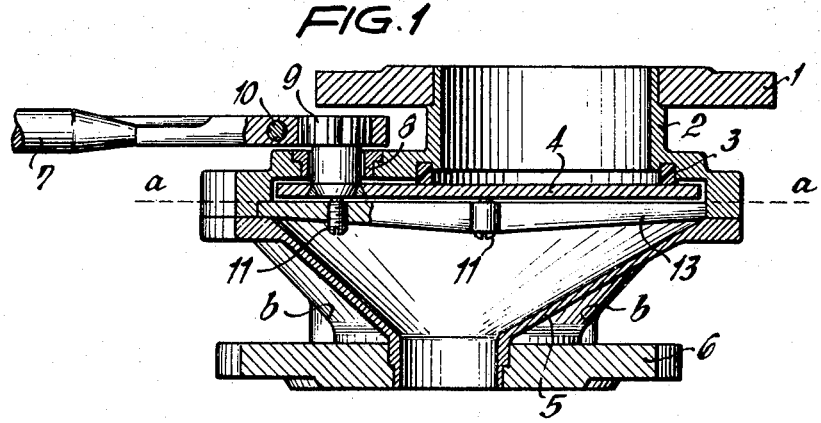
FIG. 1 is a sectional elevation of a flow control according to the invention, taken along line 1—1 of FIG. 2 in the direction of the arrows.
Figure 2:
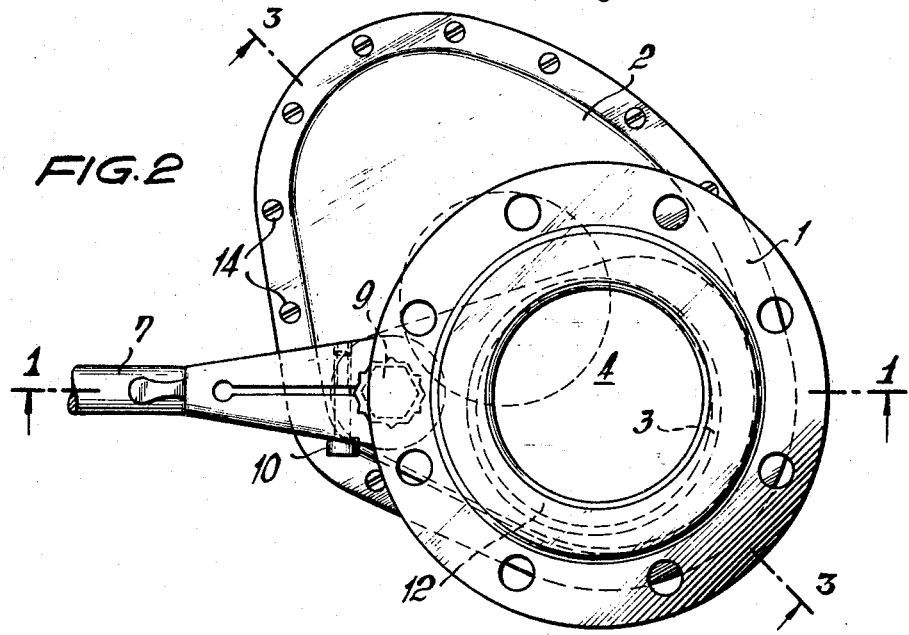
FIG. 2 is a top plan view of the structure of FIG. 1.
Figure 3:
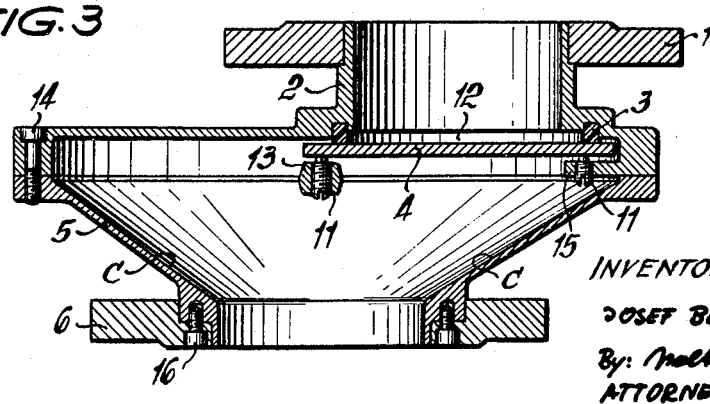
FIG. 3 is a transverse sectional elevation taken along line 3—3 of FIG. 2 in the direction of the arrows.

Referring now to FIGS. 1–3 it will be seen that the flow control of the invention illustrated therein includes an inlet housing means 2 having a substantially cylindrical tubular inlet at its upstream end, this tubular inlet projecting from a relatively flat wall, of the inlet housing means, which is of a generally oval configuration and which is situated in the region of the downstream end of the inlet housing means. It will be noted particularly from FIGS. 2 and 3 that the cylindrical inlet of the inlet housing means 2 is situated at one side of the oval-shaped flat wall of the inlet housing means, and, more precisely in the region of one end thereof.

At its interior the inlet housing means 2 has a surface surrounding the downstream end of its tubular inlet and directed in a downstream direction, and this surface is formed with an endless circular groove which receives a sealing ring 3. In accordance with the particular use which is made of the flow control of the invention the sealing ring 3 will be made of different materials. Thus, for example, in the case where the flowable medium is a soft powder, the sealing ring 3 may be made of a relatively hard material which may be plastic or metal. Where the flowable medium is abrasive, as for example in the case of quartz sand, the sealing ring 3 will be made of a relatively soft material such as, for example, an elastic plastic or even rubber.

The opening and closing of the flow control to start and stop the movement of the flowable medium, respectively, is brought about by way of a flat closure plate 4 made of a suitable metal and having an oval-shaped configuration. This plate 4 has an upstream face directed toward the inlet of the inlet housing means 2 and engaging the sealing ring 3, and the entire closure plate 4 is situated in the region of the downstream end of the inlet housing means 2. This closure plate 4 has a downstream face directed toward an outlet of the flow control and engaged by the free ends of a plurality of adjusting screws 11 which are situated at the downstream side of the closure plate 4 and which have free ends slidably engaging the downstream face of the closure plate 4. These adjusting screws 11 are threadedly carried by projections of the inlet housing means 2 situated at the downstream end thereof on the downstream side of the closure plate as well as by a transverse bar 13 of the inlet housing means 2 which is also situated at the downstream end of the inlet housing means 2. Thus, by adjusting the screws 11 in the tapped bores of the projecitons and transverse bar 13 it is possible very precisely to regulate, within narrow tolerances, the axial play of the closure plate 4 and the pressure of the latter against the sealing ring 3.

A moving means is carried by the inlet housing means and operatively connected to the closure plate 4 for moving the latter between its closed position shown in FIGS. 1–3 and an open position where it provides communication between the inlet and outlet of the flow control. This moving means includes a shaft 9 which is fixed at a lower end to the closure plate 4, as by being welded thereto, and this shaft 9 is located to one side of the cylindrical inlet of the inlet housing means 2 at the region of an end of the substantially oval-shaped closure plate 4. The axis of the shaft 9 coincides with the turning axis of the closure plate, and this axis extends perpendicularly across the major diameter of the oval-shaped closure plate 4.

As is apparent from the drawings, the inlet housing means 2 carries at its upstream end a flange 1 by means of which the flow control can be fixed to a pipe or the like, and the major diameter of the closure plate 4, when the latter is in its closed position, extends diametrically across a projection of the cylindrical inlet when projected onto the plane of the closure plate 4 in the closed position of the latter.

The rotary shaft 9 of the moving means has a non-circular exposed top end which is of hexagonal configuration, in the example shown in FIG. 2, and in the illustrated example the moving means includes an actuating lever 7 which may be manually turned or which may be power-actuated. In this latter case the lever 7 terminates distant from the shaft 9 in a bifurcated end portion for facilitating connection of the lever 7 to a motor or pneumatic drive. At its end which is fixed to the shaft 9 the lever 7 has a non-circular opening matching the configuration of the non-circular free end of the shaft 9 and receiving the latter, and this portion of the lever 7 is split so that spaced portions thereof may be drawn together by a screw 10 for clamping the free end of the lever 7 onto the shaft 9. The flat wall portion of the inlet housing means 2 is provided to one side of the cylindrical inlet thereof with an opening receiving a bearing 8 in the form of a bushing through which the shaft 9 extends so as to be guided for rotation by the bearing 8, and this slide bearing 8 serves to support the rotary movement, the entire movable assembly which includes the closure plate 4, the shaft 9 and the lever 7.

Figure 4:
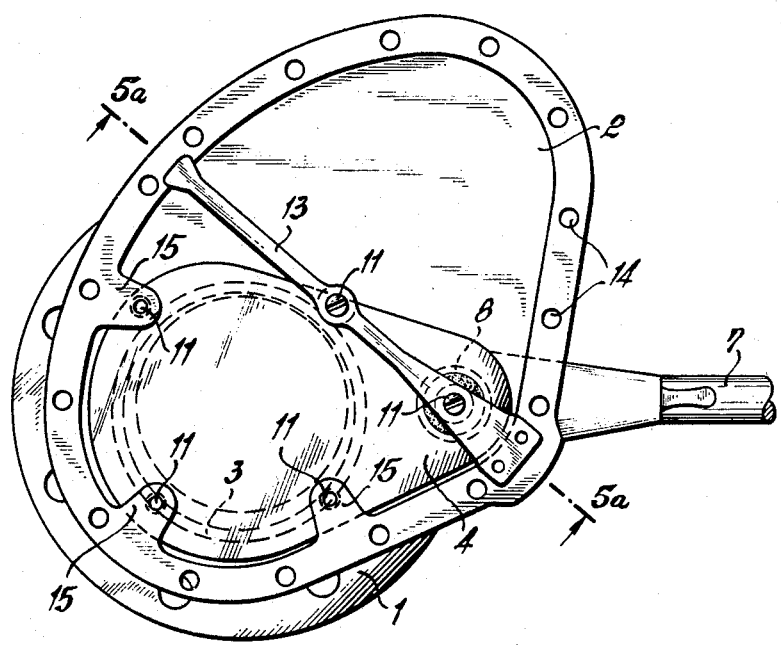
FIG. 4 is a plan view of the structure as seen when looking toward the downstream end of the inlet housing means, with the outlet housing means removed.

In order to prevent seizing or jamming of the closure plate 4 by solid particles, of the flowable medium, which may take the form of spherical particles, cube-shaped particles, shavings, cuttings, or the like, the sealing ring 3, which is of circular configuration, has its center spaced from the axis of the cylindrical inlet of the inlet housing means 2, as is particularly apparent from FIGS. 1 and 4, so that in this way seizing or jamming of the closure plate will be avoided.

The flow control of the invention includes an outlet housing means 5 of funnel-shaped configuration which is also of an elongated oval configuration and which has an outer flange at its upstream end fixed to a flange at the downstream end of the inlet housing means 2, as by the countersunk screws 14 indicated in FIGS. 2 and 3. This funnel-shaped, elongated substantially oval outlet housing means 5 terminates at its downstream end in a cylindrical outlet which carries the flange 6 by means of which the downstream end of the outlet housing means 5 can be connected into a suitable conduit or the like, for example.

The outlet of the outlet housing means 5 is situated substantially centrally thereof with the axis of the outlet displaced to one side of the axis of the inlet and thus to one side of the major diameter of closure plate 4 when the latter is in its closed position. The inlet housing means 2 and the outlet housing means 5 define between themselves an interior hollow space which is closed except for the inlet and outlet and in which the closure plate 4 is situated for movement between the closed position shown in FIGS. 1–3 and an open position where the closure plate 4 is situated to one side of the inlet providing communication between the latter and the outlet.

While the outlet housing means 5 is of a funnel-shaped configuration, it is also of the elongated oval configuration apparent from FIGS. 2 and 3, and the slope of the funnel-shaped wall of the outlet housing means 5 is the same all around the axis of the outlet. Thus, FIG. 3 shows opposed wall portions of the outlet housing means 5 having slopes c which are equal to each other while FIG. 1 indicates diametrically opposed wall portions of the outlet housing means having slopes b which are also equal to each other and to the slopes c. With this construction it is possible to make use of a funnel-shaped outlet housing means which may have a polished surface contributing to a smooth flow without any great resistance and which at the same time does not substantially increase the overall height of the entire flow control.

It is to be noted that the slopes b are equal to the slopes c, so that the slope of the funnel-shaped outlet housing means in the plane of FIG. 3 as well as in a plane perpendicular to that of FIG. 3, where the slopes b are located in FIG. 1, are equal, and thus the funnel-shaped housing means, although of an elongated oval configuration has a wall of substantially unchangnig slope surrounding the axis of the outlet.

The offset position of the inlet and outlet with respect to each other will result in a relatively small friction loss during flow of the medium through the flow control, particularly where solid particles are included in the flowable medium, but this arrangement on the other hand provides the outstanding advantage of providing for granular, powder, or sludge type of materials, which have a relatively high friction or which for any other reasons tend to stick or cake, a flow which is complete in the sense that there will be absolutely no residues remaining in the flow control structure. Furthermore, with the above-described structure of the invention, the outlet housing means makes it possible to have at its funnel-shaped portion an inexpensive interior air-permeable plate made of a sintered material or other suitable material through which it is possible to supply a gas stream under pressure so that flowable mediums which have very poor flow characteristics can flow on a film of air to greatly reduce the frictional resistance to flow.

The dotted line a—a of FIG. 1 is situated in a plane where the structure may be modified so as to include a separate endless frame having the construction shown in FIG. 7 and forming part of the inlet housing means 2 at the downstream end thereof. In this case instead of projections 15 and a transverse supporting bar 13 which are formed integrally with the inlet housing means 2, the frame 20 is a separate component of the inlet housing means. Thus, the frame 20 matches the configuration of the downstream end of the inlet housing means 2 and the upstream end of the outlet housing means 5 and is situated therebetween and fixed thereto, this frame having projections 18 which correspond to the integral projections 15 of FIGS. 1–3, and which carry the screws 19 which correspond to the screws 11. The frame has an integral transverse bar 21 corresponding to the transverse bar 13 and also carrying the adjusting screws 19 which correspond to the screws 11, the bar 21 carrying a pair of the screws 19 in the example shown in FIG. 7.

As is apparent from FIG. 6, the transverse bar 21 of the frame 20 is thicker at its central portion which receives the central adjusting screw 19. This is also apparent from FIG. 8 where the uniform thickness of the frame at its periphery is indicated. FIG. 9 shows the central portion of the supporting bar 21 provided with a screw 19 which is similar to the remaining screws 19 as well as the screws 11 of FIGS. 1–3. These adjusting screws have bevelled ends engaging the downstream face of the closure plate, and at their opposite ends they are provided with blind bores of non-circular cross section for receiving the end of a suitable wrench which may be used for adjusting the screws.

If desired, however, the frame structure of FIGS. 6–9 may be incorporated into the structure of FIG. 1 since it matches the configuration of the projections 15 and transverse bar 13, and thus the frame structure may be used in this case as a reinforcement to adapt the structure for use where very large forces are encountered. As is indicated at the lower portion of FIG. 3, screws 16 are used for attaching the flange 6 to the downstream end of the outlet housing means 5 where the cylindrical outlet thereof is located, and in the same way the flange 1 can be attached to the upstream end of the cylindrical inlet of the inlet housing means 2.

As may be seen from FIG. 4, the inlet of the inlet housing means 2, when projected onto a plane which is perpendicular to the axis of the inlet and which contains the transverse supporting bar 13, extends along a circle which is tangent to the transverse supporting bar 13, this latter bar extending perpendicularly across the turning axis of the closure plate 4. FIG. 4 also shows the openings for the screws 14 which attach the inlet housing means of FIG. 4 to the outlet housing means 5.

Figure 5A:
FIG. 5a is a longitudinal section of a transverse supporting bar taken along line 5a—5a of FIG. 4 in the direction of the arrows.
Figure 5B:
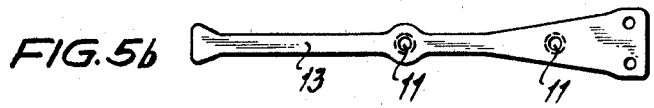

In the example shown in FIGS. 4, 5a and 5b, the transverse bar 13 is a separate component of the inlet housing means having one end of outwardly tapering, dove-tailed configuration received in a matching notch formed at the inner periphery of the flange at the downstream end of the inlet housing means, while the opposed end of the transverse bar is also received in a notch of matching configuration and has countersunk screws by means of which the transverse bar is fixed to the inlet housing means, a pair of these screws which have slotted ends being indicated at the lower right end of the transverse bar 13, as viewed in FIG. 4.

This transverse bar carries centrally thereof, in a thickened portion indicated in FIGS. 5a and 5b, a screw 11, and a second screw may be carried thereby, as indicated in FIGS. 5a and 5b. Also, FIG. 4 shows the configuration of the integral projections 15 of the inlet housing means 2 which carry in tapped bores the adjusting screws 11 which are situated at the downstream side of the closure plate.

While the above-described structure is suitable for use with a vertically flowing medium, the structure may be adapted to a horizontally flowing medium in the manner indicated in FIG. 10. In this case the inlet 23 and outlet 22 have a common axis so that the outlet 22 is not centrally situated at the funnel-shaped portion of the outlet housing means, but otherwise the structure of FIG. 10 is identical with the structure described above. In order to be adapted for use with a horizontally flowing medium, the flow control of the invention is mounted at an inclination of approximately 20°, as shown in FIG. 10, so that the lowermost wall portion 24 of the outlet housing means will be situated at an attitude where it extends substantially horizontally, thus preventing undesirable accumulation of the flowable medium in the region of the lower wall portion 24.

It is apparent that with the above-described structure not only is it possible in a very inexpensive manner to make the inner surface of the outlet housing means 5 of a highly polished construction greatly contributing to the ease of flow of the flowable medium, but in addition, whenever necessary, it is possible simply to disconnect the outlet housing means 5 from the remainder of the assembly which can remain attached to the entire installation giving access to the screws 11 so as to enable adjustments to be very conveniently carried out without removing the inlet housing means 2 and all of the structure which is carried thereby. Also, it is possible in this way to wash the closure plate 4 if necessary when the outlet housing means 5 is removed. Thus, entire disassembly of the flow control for adjusting and cleaning purposes is not required, and with almost no interruption in the production it is possible to remove the outlet housing means 5, take care of any adjustments of the screws 11 which may be required to compensate for wear, as well as take care of any cleaning operations which are required, and then the outlet housing means 5 can be very quickly replaced, so that with these simple, rapid operations it is possible to maintain a very high degree of efficiency for the operation of the flow control of the invention with almost no interruption in production.

While the flow control of the invention is perfectly suited for operations under conditions of vacuum, at the same time the adjustments which can be achieved by way of the screws 11 enable the closure plate 4 to be turned between its closed and open positions with very little expenditure of energy. It is to be noted that the screws 11 serve not only to adjust the coaction between the closure plate 4 and the sealing ring 3 but also to absorb forces which extend in the direction of flow, so that the load is very favorably distributed among the several screws 11 and the structure which carries the latter. The mechanical working required to manufacture the flow control of the invention is very limited, and at the same time the highest degree of precision is achieved while providing a flow control which can be used under the most widely varying operating conditions.

What is claimed is:

1. A flow control for starting and stopping the movement of a flowable medium, comprising inlet housing means having an upstream inlet for receiving the flowable medium, outlet housing means situated downstream of and connected with said inlet housing means and having a downstream outlet through which the flowable medium discharges, a closure plate operatively connected with said inlet housing means at the region of a downstream end thereof which is adjacent to said outlet housing means, said plate having an upstream face directed toward said inlet and a downstream face directed toward said outlet, a sealing ring carried by said inlet housing means and engaging said upstream face of said closure plate when the latter is in a closed position cutting off communication between said inlet and outlet, a plurality of adjusting screws extending in the general direction of flow of the flowable medium and situated at the downstream side of said closure plate, said screws respectively having free ends slidably engaging said downstream face of said closure plate, said inlet housing means having projections on which said screws are threadedly mounted for adjustable axial movement into engagement with said downstream face of said plate for adjusting the pressure between the latter and said sealing ring, and moving means operatively connected to said plate for moving the latter between said closed position and an open position provided communication between said inlet and outlet.

2. The combination of claim 1 and wherein said moving means is operatively connected to said plate for turning the latter between said closed and open positions about an axis extending in the general direction of flow of the flowable medium.

3. The combination of claim 2 and wherein a transverse supporting bar extends across the interior of said inlet housing means in the region of said downstream end thereof, said bar extending across the turning axis of said closure plate and said inlet of said inlet housing means, when projected onto a plane normal to said axis and containing said bar, being substantially tangent to said bar.

4. The combination of claim 3 and wherein an endless frame forms part of said inlet housing means and carries said projections on which said screws are threadedly mounted.

5. The combination of claim 2 and wherein said plate is of a generally oval configuration and has a free end situated beyond the path of flow from said inlet to said outlet, said moving means including a shaft fixed to said free end of said plate and having an axis coinciding with the turning axis thereof, and a lever releasably fixed with said shaft for turning the latter and said plate therewith about said axis.

6. The combination of claim 5 and wherein said shaft has a non-circular free end, said lever having a non-circular portion releasably clamped to said non-circular free end of said shaft.

7. The combination of claim 1 and wherein said inlet of said inlet housing means is situated at one side of the latter, said closure plate being of a generally oval configuration and having a major diameter extending diametrically across a projection of said inlet onto a plane in which said closure plate is situated when said plate is in said closed position thereof, said inlet having an axis extending perpendicularly through said major diameter of said closure plate when the latter is in said closed position thereof, and said outlet housing means having a funnel-shaped portion, said outlet of said outlet housing means being situated substantially centrally thereof and having an axis laterally offset from said axis of said inlet, and said funnel-shaped portion of said outlet housing means having a wall substantially unchanging slope surrounding said axis of said outlet.

8. The combination of claim 1 and wherein said outlet and said inlet have a common axis extending through closure plate when the latter is in said closed position thereof.

9. The combination of claim 1 and wherein said inlet has a predetermined axis extending through said closure plate when the latter is in said closed position thereof, and said sealing ring having a center spaced from said axis of said inlet so that said sealing ring is eccentrically situated with respect to said inlet.

10. The combination of claim 1 and wherein said inlet housing means and outlet housing means define between themselves an interior space which is closed except for said inlet and outlet, and said closure plate being situated in said space for movement therein.

References Cited

UNITED STATES PATENTS

| 821,943 | 5/1906 | Kennedy | 251—193 X |
| 2,556,225 | 6/1951 | Serge | 251—193 |
| 2,786,644 | 3/1957 | Koppl | 251—193 X |
| 2,805,836 | 9/1957 | Taylor | 251—177 |
| 3,047,006 | 7/1962 | Transeau | 251—177 X |
| 3,170,668 | 2/1965 | Aulisa | 251—193 X |
| 3,258,243 | 6/1966 | Bryant | 251—193 X |

CLARENCE R. GORDON, Primary Examiner

U.S. Cl. X.R.

251—326, 329